US008973105B2

(12) United States Patent
Mechaley, Jr.

(10) Patent No.: US 8,973,105 B2
(45) Date of Patent: Mar. 3, 2015

(54) SYSTEM AND METHOD FOR COMPUTER AUTHENTICATION USING AUTOMATIC IMAGE MODIFICATION

(71) Applicant: MobileSphere Holdings LLC, Kirkland, WA (US)

(72) Inventor: Robert G. Mechaley, Jr., Kirkland, WA (US)

(73) Assignee: MobileSphere Holdings II LLC, Kirkland, WA (US)

( * ) Notice: Subject to any disclaimer, the term of this patent is extended or adjusted under 35 U.S.C. 154(b) by 163 days.

(21) Appl. No.: 13/826,378

(22) Filed: Mar. 14, 2013

(65) Prior Publication Data

US 2014/0282885 A1  Sep. 18, 2014

(51) Int. Cl.
*G06F 7/04* (2006.01)
*G06F 15/16* (2006.01)
*G06F 9/00* (2006.01)
*H04L 29/06* (2006.01)
*G06F 21/34* (2013.01)
*G06F 21/36* (2013.01)

(52) U.S. Cl.
CPC .............. *H04L 63/08* (2013.01); *G06F 21/34* (2013.01); *G06F 21/36* (2013.01)
USPC .......................................................... 726/4

(58) Field of Classification Search
CPC .......... H04L 9/32; H04W 12/06; G06F 21/00; G06F 21/34; G06F 21/35; G06F 21/36; G06F 21/445
USPC ............... 713/154, 168, 172; 726/4, 5, 6, 7, 9
See application file for complete search history.

(56) References Cited

U.S. PATENT DOCUMENTS

| 8,122,255 | B2* | 2/2012 | Merrill ........................ 713/176 |
| 8,387,126 | B2* | 2/2013 | Di Crescenzo ................. 726/9 |
| 2010/0275010 | A1* | 10/2010 | Ghirardi ....................... 713/155 |
| 2012/0084846 | A1* | 4/2012 | Weis et al. ....................... 726/6 |
| 2012/0159613 | A1* | 6/2012 | Griffin et al. ................... 726/19 |

* cited by examiner

*Primary Examiner* — Peter Poltorak
*Assistant Examiner* — Quy Pham
(74) *Attorney, Agent, or Firm* — Michael J. Donohue; Davis Wright Tremaine LLP

(57) ABSTRACT

Computers can be authenticated using automatically combined images. During an authentication process, a server transmits an image to a client. The transmitted image is combined with a stored image using a randomly selected logical operator to generate a combined image. The combined image is transmitted back to the server. The server has a copy of the transmitted image and the stored image and generates a series of template combined images using different logical operators selected from a set of logical operators to determine whether any of the template combined images match the received combined image. If the received combined image matches one of the template combined images, the user is authenticated.

22 Claims, 14 Drawing Sheets

US 8,973,105 B2

SYSTEM AND METHOD FOR COMPUTER AUTHENTICATION USING AUTOMATIC IMAGE MODIFICATION

BACKGROUND OF THE INVENTION

1. Field of the Invention

The present disclosure is directed to authentication systems in general and, more specifically, to a system and method for computer authentication using modification of an image using a shared secret.

2. Description of the Related Art

Early computer systems usually involved a large mainframe computer to which a number of terminals were directly connected. In early computer systems, these terminals were often in the form of teletype machines. Early computers also had card readers that were also directly connected to the machine. Network security generally involved simply providing a user identification (ID) and password.

The development of networked computer systems and a client server architecture meant that computer terminals were often connected together over great distances using a wide-area network (WAN), such as the Internet. Early computer terminals evolved from a "dumb" terminal to sophisticated computers with a significant amount of computing power in each of the various system servers and clients.

Computer security has become a much greater concern because of the accessibility of many computer networks via a WAN. Early computer security was generally directed towards authentication of a user wishing access to a computer system or network. Different techniques have evolved to provide authentication of the user. The most common form is a user name and password that should be known only to the individual user and to the server with which the user wishes to connect.

Although techniques have been developed to authenticate a user wishing access to a computer system or network, there is still a significant need for techniques to authenticate the computer system or network to the user. For example, a user accessing a bank account via the WAN wants to be sure they are communicating with their bank instead of an unscrupulous computer server that "spoofs" the actual bank website. If the user is fooled into believing that they have accessed their bank website, the user may unknowingly divulge confidential information such as user names, passwords, account numbers, credit card numbers, and the like. Unfortunately, the user often discovers the spoofing only after their account has been hacked and money has disappeared from their account.

Therefore, it can be appreciated that there is a significant need for techniques for computer and user authentication. The present disclosure provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

As noted in the background section, early computer security generally related to the problem of user authentication. However, the development of sophisticated computer networks or distributed networks accessible via a wide-area network (WAN), such as the Internet, have given rise to a need for the authentication of the computer system as well as the individual. In one example provided above, an individual wants to authenticate their bank computer network prior to providing any confidential information to an unauthenticated computer network. Similarly, government or military computer networks have a great need for increased security in the form of computer network authentication in addition to authentication of the individual seeking access to the computer network. That is, it is important for a user to authenticate that they are truly accessing a government or military computer network prior to disclosing any confidential or proprietary information. Similarly, large businesses may have distributed computer networks and employees accessing the network must be authenticated to the computer system. In addition, the techniques described herein can be used to authenticate the computer to the individual. Specifically, a secret is initially shared between two elements in the system. At least a portion of the shared secret is known to the user. At a subsequent time, when authentication is required, one system element creates an image using the shared secret and transmits that image. The other system element with knowledge of the shared secret captures the image and analyses it to determine if it was constructed in accordance with the shared secret. Since the shared secret was known only to two trusted elements within the system, if the image contains the shared secret, those elements can be authenticated. Furthermore, the user knows at least a portion of the shared secret, referred to herein as a shared modification secret, that will permit the user to modify the image and transmit the modified image back to the element of the system that generated the image to thereby authenticate the individual as well as the system elements.

Figure 1:
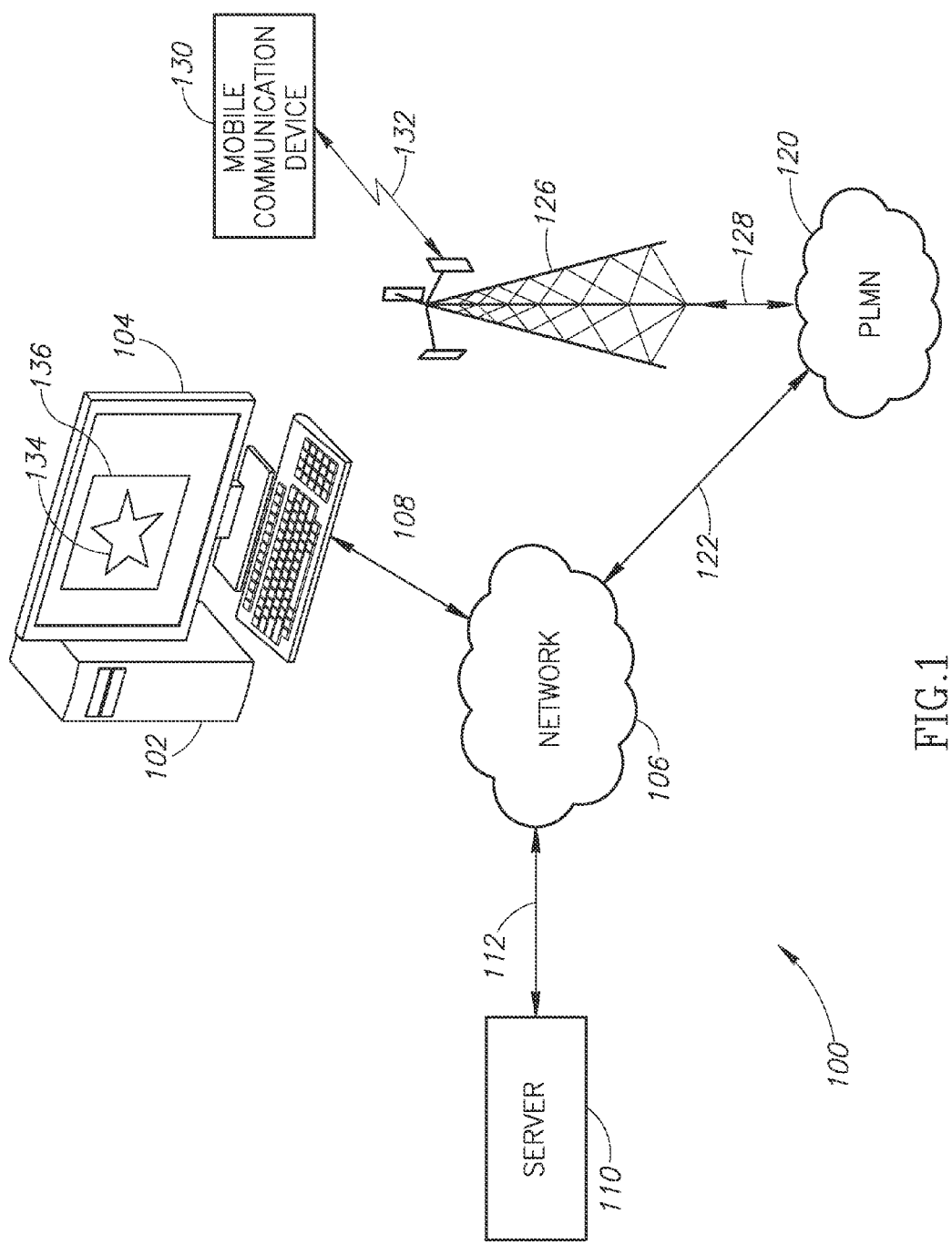
FIG. 1 is an exemplary embodiment of a system architecture constructed in accordance with the present teachings.

The present disclosure is embodied, in one example, in a system 100 illustrated in FIG. 1. A computer 102 having a display 104 is coupled to a network 106, such as the Internet, via a communication link 108. The computer 102 includes a network interface controller (NIC) (not shown) to provide the necessary connectivity to the communication link 108. The network 106 in FIG. 1 generically represents networks and typically would represent a wide-area network (WAN). The network 106 may be implemented as the Internet, or a private WAN. The system 100 is not limited by the specific form of the network 106. The system 100 provides a technique to verify the identity of a user of the computer 102 as well as the computer 102 and the server 110. Once example of user authentication is described in pending U.S. application Ser. No. 12/961,392 filed on Dec. 6, 2010, entitled "System and Method for Identity Verification on a Computer," and assigned to the assignee of the present disclosure. That application is incorporated herein by reference in its entirety. The computer 102 may be a private computer (e.g., an individual's personal computer) or a public computer (e.g. in a library or hotel lobby). Furthermore, although the computer 102 is illustrated as a personal computer, those skilled in the art will appreciate that the principles of the system 100 are applicable to any computing device capable of rendering images, such as an automated teller machine (ATM), point-of-sales (POS) terminal, or the like. Thus, the system 100 is not limited to a particular form of computing device.

The system 100 includes a server 110 coupled to the network 106 via a communication link 112. In the following discussions, the server 110 generically represents the computer system or computer network which requires authentication to the user of the computer 102. Those skilled in the art will appreciate that the server 110 can be implemented in a variety of different fashions as a single server, multi-server, large frame computer, or the like. The server 110 may also represent a computer network, such as a government, military, or corporate computer network that the computer 102 wishes to access. The system 100 is not limited by the specific implementation of the server 110.

As will be described in greater detail below, the server 110 may initiate the authentication process. For example, the server 110 could host a website for on-line purchases. Alternatively, the server 110 may host the website for a bank or other financial institution. In yet another alternative embodiment, the server 110 may host a secure website, such as a business, law firm, or the like. In this embodiment, the server 110 effectively acts as a gateway and may provide access to a secure local area network (LAN). If the computer 102 wishes to access the server 110, the server initiates the user authentication process. In a simple embodiment, user authentication may simply be a user ID and password. Other authentication processes, such as described in the above-referenced patent application (U.S. application Ser. No. 12/961,392) may be used.

In one embodiment, the system 100 utilizes a mobile communication network, such as a public land mobile network (PLMN) 120 coupled to the network 106 via a communication link 122. Those skilled in the art will appreciate that the communication links 108, 112, and 122 may be implemented in many different forms, including hard wired, fiber optic, microwave, wireless, or the like. For example, the communication link 108 connecting the computer 102 to the network 106 may be implemented using a dial-up modem, cable modem, satellite connection, wireless network, or the like. The system 100 may be satisfactorily implemented by one or more of these technologies, alone or in combination, for the communication links 108, 112, and 122. The system 100 is not limited by the specific form of these communication links.

A base station 126 is coupled to the PLMN 120 via a backhaul communication link 128. Those skilled in the art will appreciate that a typical wireless communication network, such as the PLMN 120, includes a large number of base stations. However, for the sake of clarity, FIG. 1 illustrates only the base station 126.

A mobile communication device 130 is coupled to and in communication with the base station 126 via a wireless link 132. The mobile communication network, including the PLMN 120, base station 126, and mobile communication device 130 are illustrated in FIG. 1 as a generic wireless communication system. Those skilled in the art will appreciate that the elements of FIG. 1 that make up the wireless network may be implemented in accordance with any known wireless communication system. For example, the PLMN 120, base station 126 and mobile communication device 130 may be implemented in accordance with any known communication protocol, such as GSM, CDMA, WiFi, WiMAX, 3G, 4G, LTE, or the like. Operational details of these various communication protocols are known in the art and need not be described in greater detail herein.

As will be described in greater detail below, the server 110 generates an image 134 in accordance with the shared secret and transmits the image to the computer 102 via the network 106. The image 134 is shown on the display 104. In one embodiment, the shared secret is known to both the server 110 and the computer 102. In this embodiment, the computer 102 may analyze the image 134 on the display 104 to determine if it was created in accordance with the shared secret. If the image 134 on the display 104 is generated in accordance with the shared secret, the server 110 is authenticated. To authenticate the user of the computer 102, the user modifies the image 134 on the display 104 in accordance with the shared modification secret. For example, the user can draw a rectangle 136 around the image 134 as illustrated in FIG. 1. Other examples are provided below. The user-modified image is transmitted back to the server 110 where the server determines if the image modification has been made in accordance with the shared modification secret known to the user. If the image has been modified in accordance with the shared modification secret, the user is also now authenticated.

In an alternative embodiment, the mobile communication device 130 is used to authenticate the server 110 and the user of the computer 102. To authenticate the server 110, the user snaps a picture of the image on the display 104 using an imaging capability in the mobile communication device 130, such as a camera. The image captured by the mobile communication device 130 is evaluated to determine if it contains the shared secret. If the image contains the shared secret, the server 110 is authenticated because only the server 110 and the mobile communication device 130 have knowledge of the shared secret. The user of the computer 102 and the mobile communication device 130 may be authenticated when the user modifies the image on the display at the mobile communication device 130 and transmits the modified image back to the server 110 via the PLMN 120. In turn, the server 110 analyzes the modified image to determine if it has been modified in accordance with the shared modification secret. If the image transmitted from the mobile communication device 130 has been modified in accordance with the shared modification secret, the user of the computer 102 and mobile communication device 130 can be authenticated.

In addition, the server 110 has stored information relating the identity of the mobile communication device 130 to a particular user. When the image on the display 104 is captured by the mobile communication device 130 and modified in accordance with the shared modification secret, the captured and modified image transmitted from the mobile communication device 130 to the server 110 via the PLMN 120 also contains information identifying the mobile communication device. The server 110 may compare the information identifying the mobile communication device to determine that it is associated with the user of the computer 102. This provides further authentication of the user in that the user of the computer 102 is associated with the identity of the mobile communication device 130. This means that the user present at the computer 102 must also have possession of the mobile communication device 130 at the time the image 134 is shown on the display 104. Furthermore, only the authenticated user would know the portion of the shared modification secret that will permit modification of the image on the display 104 that was captured by the mobile communication device 130.

In yet another alternative embodiment, the image on the display 104 may be modified by the user operating the computer 102 such that the image on the display 104 is modified in accordance with the shared modification secret. In this embodiment, the mobile communication device 130 captures the modified image from the display 104 and transmits the captured modified image to the server 110 via the PLMN 120 in the manner described above. In either embodiment, the server 110 receives a modified image (modified by the computer 102 or the mobile communication device 130) and analyzes the modified image to determine if it has been modified in accordance with the shared modification secret.

Figure 2:
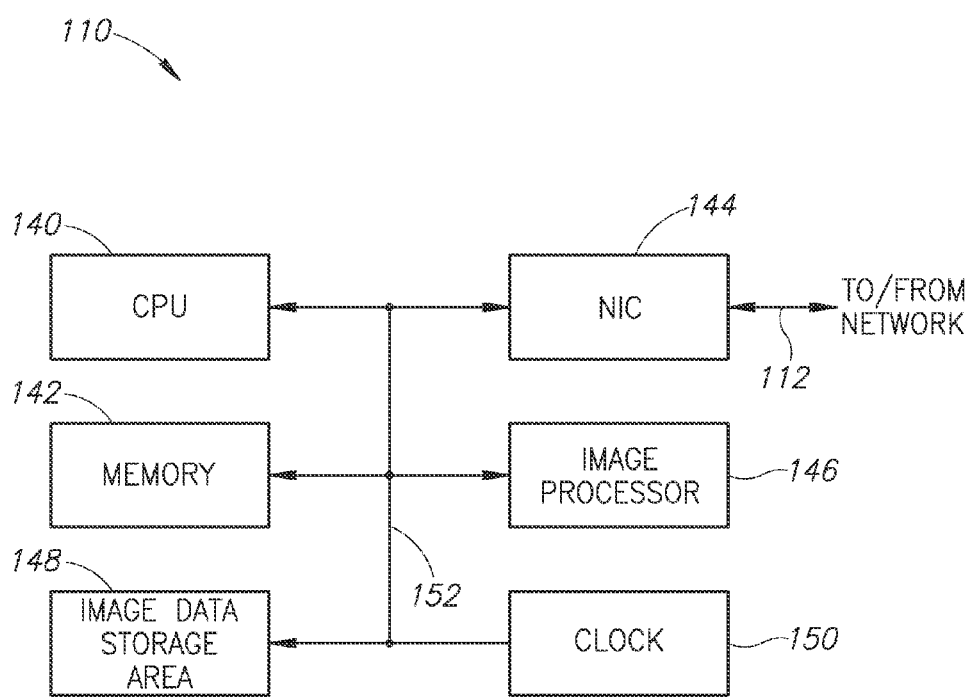
FIG. 2 is a functional block diagram of a server constructed in accordance with the present teachings.

FIG. 2 is a functional block diagram of the server 110. The server 110 includes a central processing unit (CPU) 140 and a memory 142. In general, the memory 142 contains data and instructions that are executed by the CPU 140. The CPU 140 may be implemented as a conventional microprocessor, microcontroller, digital signal processor, application specific integrated circuit, or the like. The server 110 is not limited by the specific implementation of the CPU 140.

Similarly, the memory 142 may be implemented with a variety of known technologies. The memory 142 may include random access memory, read-only memory, programmable memory, and the like. In one embodiment, a portion of the memory 142 may be integrated into the CPU 140. The server 110 is not limited by the specific form of the memory 142. The shared secret is stored in the memory 142 in association with the individual user. The shared secret may be stored in a protected form, such as encrypted data, secure location, or the like.

FIG. 2 also illustrates a network interface controller (NIC) 144. The NIC 144 generically represents the interface between the server 110 and the network 106. The specific implementation of the NIC 144 depends on the particular interface type and is within the scope of knowledge of one of ordinary skill in the art. For example, the NIC 144 may be an Ethernet interface coupled to a network access point (not shown). Alternatively, the NIC 144 may be a wireless interface or other known form of interface depending on the nature of the communication link 112 between the server 110 and the network 106. The server 110 is not limited by the specific implementation of the NIC 144.

The server 110 also includes an image processor 146 and an image storage area 148. As will be described in greater detail below, the image processor 146 may be used in one embodiment to generate images in accordance with the shared secret. If the image processor 146 generates the image for transmission to the computer 102, a copy of the image is temporarily stored in the image storage area 148 for later comparison with a captured image. As described above, the user captures the image on the display 104 with the mobile communication device 130 and analyzes it to verify that the image on the display 104 contains the shared secret known only to the authentic server 110 and to the authentic computer and/or the mobile communication device 130. If the image contains the shared secret, the server 110 is authenticated by the computer 102 and/or the mobile communication device 130 that determines that the image on the display 104 was generated in accordance with the shared secret.

If the computer 102 is a public computer (e.g., in a library or hotel lobby), it will not be aware of the shared secret. In this embodiment, the shared secret is known by the mobile communication device 130. The computer 102 receives and displays the image on the display 104, but cannot analyze the image because it does not know the shared secret. The mobile communication device 130 captures the image on the display 104 and performs the analysis to determine if the captured image was generated in accordance with the shared secret to thereby authenticate the server 110. The user operates the mobile communication device 130 to modify the captured image in accordance with the shared modification secret. The mobile communication device 130 transmits the captured and modified image, via the PLMN 120 and the network 106, to the authentication server 110. The image processor 146 analyzes the modified image to determine if it was modified in accordance with the shared modification secret. If the image was modified in accordance with the shared modification secret, the user is thereby authenticated.

FIG. 2 also illustrates a clock 150. As will be described in greater detail below, the image processor 146 can use the clock 150 to generate a time of day or date stamp when generating an image or when selecting an image from the image storage area 148. The date stamp can be used to make sure that the image is current. That is, the image is only valid for a predetermined period of time. In this embodiment, the modified image must be returned to the server 110 within a predetermined period of time.

The various components of FIG. 2 are coupled together by a bus system 152. The bus system 152 may comprise an address bus, data bus, control bus, power bus, and the like. For the sake of clarity, those various buses are illustrated in FIG. 2 as the bus system 152.

Those skilled in the art will appreciate that some of the functional blocks in FIG. 2 may be implemented as a set of instructions stored in the memory 142 and executed by the CPU 140. For example, the image processor 146 can be implemented as a separate device (e.g., a digital signal processor) or implemented as a set of instructions stored in the memory 142. Because the image processor 146 performs a separate function, it is illustrated as a separate block in the functional block diagram of FIG. 2.

Similarly, the image storage area 148 may be implemented as a separate storage component or integrated into the memory 142. The image storage area 148 may be implemented as any suitable data structure. In one embodiment, the image storage area 148 may be implemented as a database that may be an integral part of the server 110 or implemented as a separate component coupled to the authentication processor 110. For example, the image storage area 148 may be coupled to the server 110 via a local area network (LAN). In a distributed computer network, the image storage area 148 may be coupled to the network 106 and in communication with the server 110 via the network 106.

The mobile communication device 130 performs a number of functions. First, it takes a picture of an image displayed on the display 104 of the computer 102. Secondly, it analyzes the captured image to determine whether the image is constructed in accordance with the shared secret. Details of the shared secret analysis and examples are provided below. If the image is constructed in accordance with the shared secret, the server 110 is authenticated. In that event, the mobile communication device 130 accepts user input to modify the image. The mobile communication device 130 provides a file name for the modified image. In an exemplary embodiment, the file name of the image may include the IMSI of the mobile communication device 130 and a time stamp indicating the time at which the image was captured or modified. In addition, the mobile communication device 130 sends the modified image to a predefined address. The mobile communication device 130 executes a simple application program that allows the capture and analysis of an image, the modification of the captured image, and the automatic transfer of the modified image, via the PLMN 120, to a URL associated with the server 110. It should be noted that the image generated in accordance with the shared secret does not contain any embedded data that requires extraction and analysis by the mobile communication device 130. The shared secrets are intended to provide simple image analysis that may be readily performed by the client computer 102 or the mobile communication device 130. Examples of images constructed in accordance with the shared secret are provided below.

Figure 3:
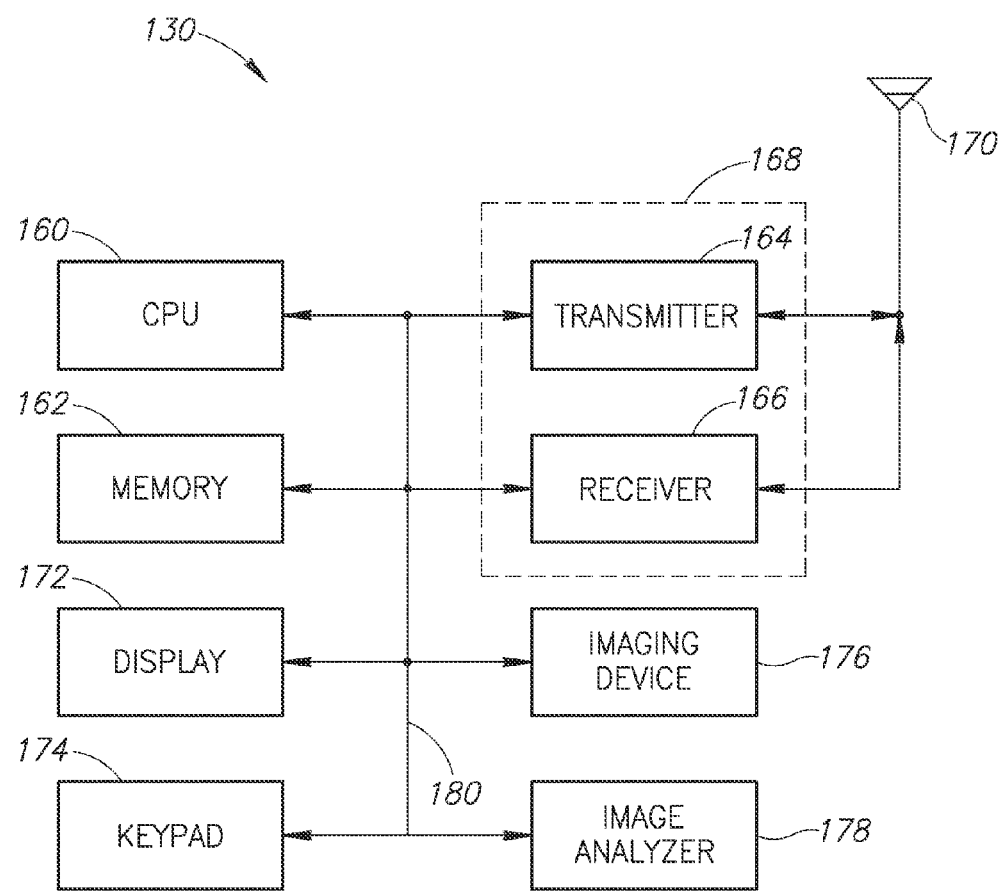
FIG. 3 is a functional block diagram of a mobile communication device constructed in accordance with the present teachings.

FIG. 3 is a functional block diagram of the mobile communication device 130. The mobile communication device 130 includes a CPU 160 and memory 162. In general, the memory 162 contains data and instructions that are executed by the CPU 160. The CPU 160 may be implemented as a conventional microprocessor, microcontroller, digital signal processor, application specific integrated circuit, or the like. The mobile communication device 130 is not limited by the specific implementation of the CPU 160.

Similarly, the memory 162 may be implemented with a variety of known technologies. The memory 162 may include random access memory, read-only memory, programmable memory, and the like. In one embodiment, a portion of the memory 162 may be integrated into the CPU 160. The mobile communication device 130 is not limited by the specific form of the memory 162. The memory 162 is also used to store the shared secret. As will be described in greater detail below, the shared secret is known only to the authentic server 110 and to the authentic client computer 102 and/or the authentic mobile communication device 130. In this embodiment, the mobile communication device 130 captures the image on the display 104 (see FIG. 1) of the computer 102 and analyzes the captured image using the shared secret stored in the memory 162.

FIG. 3 also illustrates a network transmitter 164 and a network receiver 166. In many implementations, the transmitter 164 and receiver 166 share common circuitry and are implemented as a transceiver 168. The transceiver 168 is coupled to an antenna 170. The transceiver 168 is illustrated in FIG. 3 as a generic device. Those skilled in the art will appreciate that the specific implementation of the transceiver 168 may depend on the particular PLMN 120 with which the mobile communication device 130 communicates. For example, the transceiver 168 in one mobile communication device 130 may be configured for operation in accordance with GSM standards while the transceiver 168 in a different mobile communication device may be configured for operation in accordance with CDMA or other communication protocols. However, as noted above, the system 100 may be readily implemented on mobile networks using various communication protocols and is not limited to any particular communication protocol.

In addition, the mobile communication device 130 includes a display 172 and keypad 174. The display 172 may be a black and white or color display and, in some embodiments, may be a touch-sensitive display. In this embodiment, the functionality of the keypad 174 may be combined with the display 172. These input/output devices operate in a conventional manner. In operation, the user manipulates the keypad 174 or, as is common in many modern mobile communication devices, uses a touch-sensitive display 172 to modify the captured image shown on the display. Examples of image modification will be described in detail below.

FIG. 3 also illustrates an imaging device 176. The imaging device 176 may include a charge-coupled device and a lens (not shown), as is common in many wireless devices. Technical details of the imaging device 176 to capture an image are well known in the art, and need not be described in greater detail herein.

An image analyzer 178 uses the shared secret stored in the memory 162 to analyze the captured image to determine whether the captured image contains the shared secret. In operation, the image analyzer 178 may typically be implemented as a set of instructions stored in the memory 162 and executed by the CPU 160. Those skilled in the art will appreciate that the image analysis can be readily implemented by the mobile communication device 130 without extensive signal processing or excessive computations.

The various components in FIG. 3 are coupled together by a bus system 180. The bus system 180 may include an address bus, data bus, control bus, power bus, and the like. For the sake of clarity, those various buses are illustrated in FIG. 3 as the bus system 180.

Figure 4:
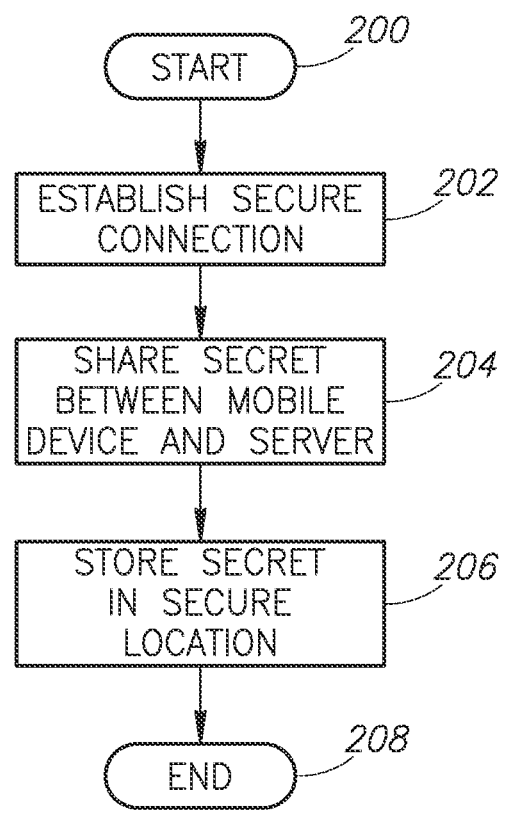
FIG. 4 is a flow chart illustrating an exemplary embodiment of the system to establish a secret shared between the client and server computers.

FIG. 4 is a flow chart illustrating an exemplary embodiment of a process to establish a shared secret. At a start 200, there is the server 110 and the mobile communication device 130. In step 202, the mobile communication device 130 and authentication server 110 establish a secure connection. The secure connection can be established using a variety of known techniques. In one example, the mobile communication device 130 may have web browsing capability. In this embodiment, the mobile communication device 130 can establish a secure connection (e.g., https) with the server 110 via the network 106. In another example, the mobile communication device 130 may be physically connected to the server 110 either directly or through another computer coupled to the server. In this embodiment, there is a secure hard wired connection between the mobile communication device 130 and the server 110. In yet another embodiment, the secure connection can be established between the server 110 and another authenticated computer, such as the authenticated client computer 102 (not available if the computer 102 is a public computer) and the shared secret downloaded to a memory device, such as a flash drive. Subsequently, the flash drive can be connected to the authenticated computer to which the mobile communication device 130 can be connected. The shared secret is thus side-loaded from the memory device to the mobile communication device 130. These are just a few examples of the number of different known techniques that can be used to establish the secure connection.

In step 204, the server 110 shares a secret with the wireless communication device 130. Those skilled in the art can appreciate that either element (i.e., the mobile communication device 130 or the server 110) may initially generate the secret. As will be discussed in greater detail below, the secret will be related to an image such that analysis of the image will be relatively simple. The image need not be created at the time that the secret is shared, but must be generated in accordance with the shared secret. Furthermore, it is important to note that the image itself is not provided to the computer 102 or the mobile communication device 130 in advance of a log-in process and need not be known to the user at all. That is, the user may not be aware of all aspects of the shared secret used to generate the image. However, the user must be aware of the shared modification secret that will allow the user to modify the image transmitted by the server 110.

Some conventional systems allow a user to select a single image during an initial set-up process. Anytime a user logs onto that web site, the user-selected image is displayed as a simple form of server authentication. However, this is not based on a shared secret contained within the image, as is described herein.

In step 206, the mobile communication device 130 and the server 110 store the shared secret in a secure location within the respective devices and the process ends at 208. At this point, at least one portion of the shared secret is known only to the mobile communication device 130 and the server 110. The portion of the shared secret known to the mobile communication device 130 is that the image generated by the server 110 and transmitted to the computer 102 (see FIG. 1) will be generated in accordance with the shared secret if the server 110 is the authentic server. However, the mobile communication device 130 need not be aware of the nature of the modification of the image to be generated by the user. This provides an even greater level of security. If the mobile communication device 130 is lost or stolen, an unauthorized individual who may find the mobile communication device cannot be authenticated because they do not know the manner in which the captured image must be modified. In contrast, the server 110 is aware of the user modification that must be made to the image. The various system elements are authenticated because the mobile communication device 130 can analyze the image from the server 110 to determine if it was generated in accordance with the shared secret thereby authenticating the server 110. In turn, the user must modify the generated image in accordance with the shared modification secret known only to the authentic server 110 and the authentic user. The modified image is transmitted back to the server 110 to thereby complete the authentication process. Because the secret was initially shared during a secure connection, the mobile communication device 130 has confidence in the authenticity of the server 110.

Figure 5:
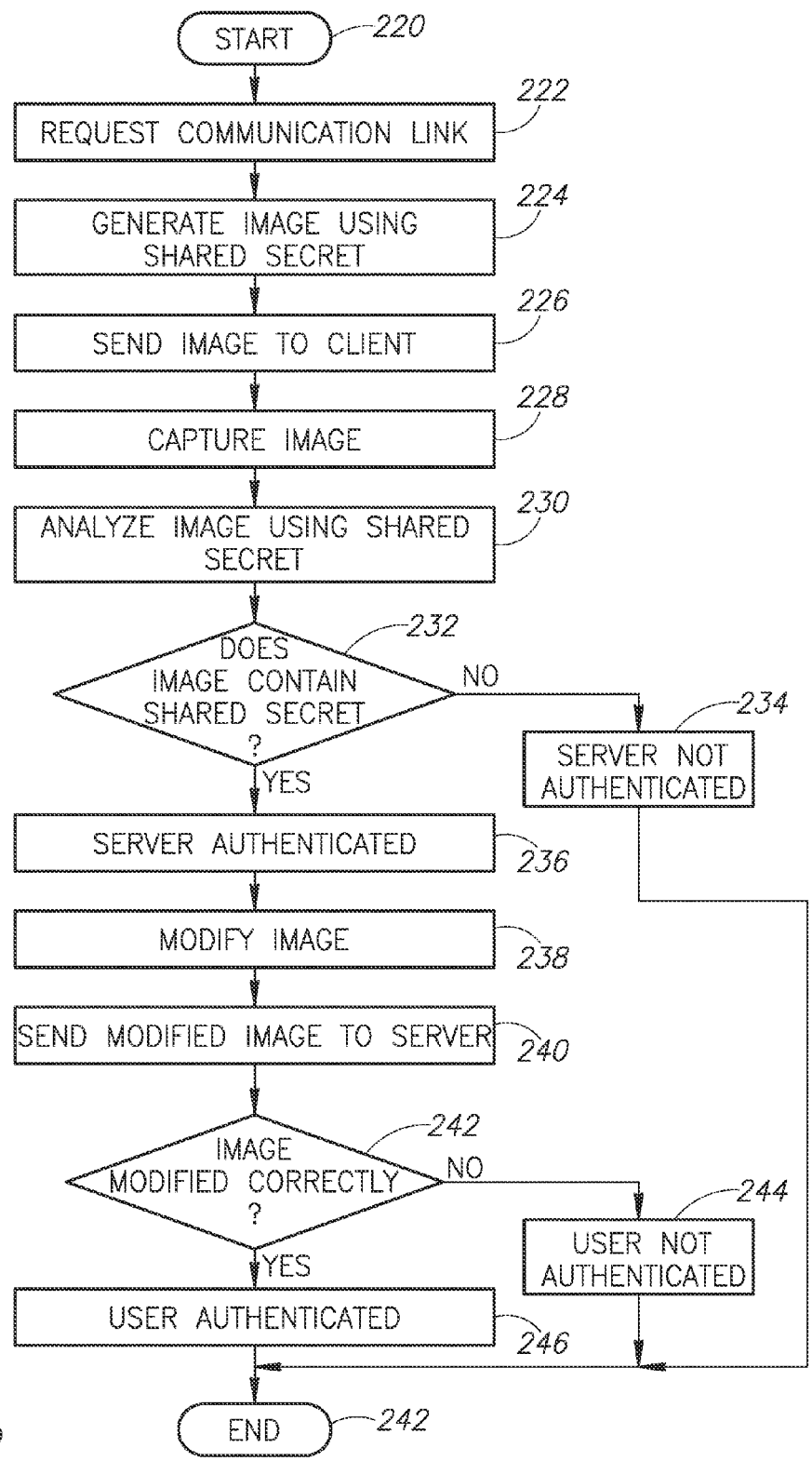
FIG. 5 is a flow chart illustrating an exemplary embodiment of the system to authenticate a server using the shared secret established in FIG. 2.

At a later point in time, the computer 102 wishes to establish a connection with the server 110 via, by way of example, the network 106, as illustrated in FIG. 1. It is at this stage that the user of the computer 102 wishes to authenticate the server 110. This process is illustrated in FIG. 5 where, at a start 220, the computer 102 and server 110 are each connected to the network 106 via their respective communication links 108 and 112. At step 222, the computer 102 generates a request to establish a communication link. This process may be initiated, for example, by the computer 102 navigating to a website associated with the server 110.

In step 224, the server 110 generates an image using the shared secret known only to the authentic server 110 and the authentic mobile communication device 130. In one embodiment, the server 110 dynamically generates the image using the shared secret after the computer 102 requests access to the server 110. However, those skilled in the art will appreciate that the server 110 may also generate the image using the shared secret in advance of any request for access by the computer 102. The generated image may be stored in association with identity data for the authentic computer 102 or a specific user, in association with a user name (e.g., user ID) and password. Thus, step 224 may be executed in advance of the request for a communication link in step 222 with the generated image being stored for future use.

In step 226, the server 110 transmits the image to the computer 102 via the network 106 and the communication links 112 and 108. Examples of images generated using the shared secret are described below.

In step 228, the user captures the image 134 on the display 104 (see FIG. 1) using the imaging device 176 on the mobile communication device 130 (see FIG. 3). In step 230, the image analyzer 178 within the mobile communication device 130 analyses the image to determine if it contains an element in accordance with the shared secret.

In decision 232, the mobile communication device 130 determines whether the image contains the shared secret. If the captured image does not contain the shared secret, the result of decision 232 is NO and, in step 234, the server 110 is not authenticated. If the server 110 is not authenticated, the mobile communication device 130 will not permit the modification of the captured image and will not transmit the captured image back to the server 110. In addition, the mobile communication device 130 may display a message on the display 172 indicating that the server 110 is not authenticated. The user may thus discontinue communication between the computer 102 and the unauthenticated server and the authentication process ends at 248.

If the captured image does contain the shared secret, the result of decision 232 is YES and in step 236, the server 110 is authenticated. In step 238, the user operates the keypad 174 (see FIG. 3) or the touch-sensitive display 172 to modify the image in accordance with the shared modification secret known only to the authentic user and the authentic server 110. In step 240, the mobile communication device 130 transmits the modified image back to the authentic server 110 via the PLMN 120 as described above.

The server 110 analyzes the modified image in decision 242 to determine if the image has been modified correctly. If the image has not been modified correctly, the result of decision 242 is NO and, in step 244, the user is not authenticated. If the user is not authenticated, the server will terminate communications with the computer 102 (see FIG. 1).

If the image has been modified correctly, the results of decision 242 is YES and, in step 246, the user is authenticated by the server 110. Following the user authentication in step 246, or the failure to authenticate the server in step 234 or the failure to authenticate the user in step 244, the process ends at 248. Thus, the system 100 provides a technique for authenticating various system elements as well as the user in the examples described herein, the system authenticates the server 110, the computer 102, and the individual user operating the computer 102 and the mobile communication device 130.

Figure 6A:
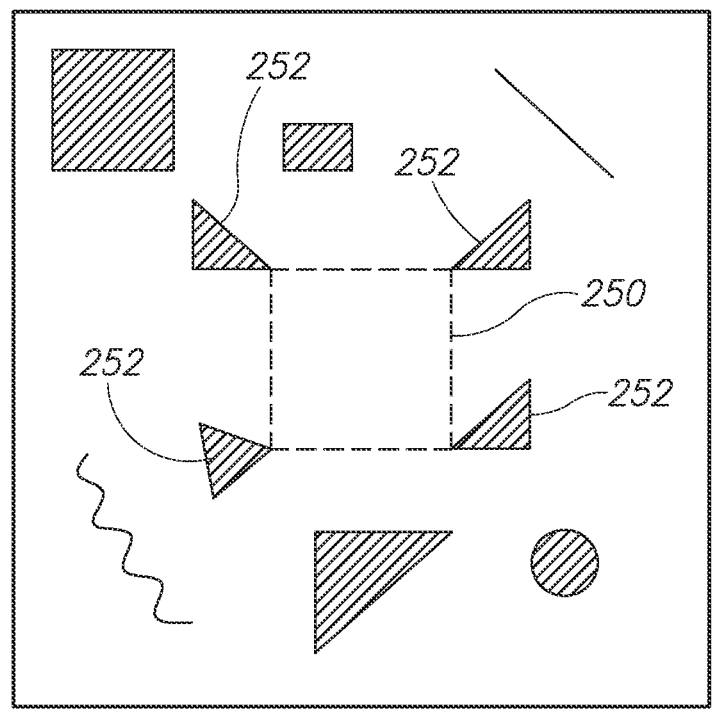
FIG. 6A is an example of an image in which there is a secret geometric relationship between elements of the image.

FIGS. 6-12 provide non-limiting examples of the type of images that can be created using the shared secret. It is intended that the authentication process is based on elements within the image itself rather than some form of data encrypted or embedded within the image. Thus the images generated using the shared secret may be readily analyzed by the mobile communication device 130 to authenticate the server 110. For example, FIGS. 6A and 7A illustrate images where there is a geometric relationship between objects in the image. FIG. 6A illustrates a seemingly random collection of geometric shapes, such as squares, triangles, rectangles, circles, at the like. However, the shared secret in the example of FIG. 6 is that the image must allow the formation of a square 250 by connecting the vertices of four triangles 252. The precise location of the triangles 252 within the image is not critical. Rather, it is the spatial relationship between the triangles 252 that permits the square 250 to be formed by connecting lines between the vertices of the triangles. Without knowledge of this shared secret, the server 110 cannot generate an image having the appropriate geometric relationship. Furthermore, the mobile communication device 130 cannot analyze the image of FIG. 6A without knowledge of the shared secret. Thus, each of the system elements (e.g., the mobile communication device 130 and the server 110) must have knowledge of the shared secret. If either of these system elements is not the authentic system element, it will not contain the knowledge of the shared secret and cannot provide the proper authentication. In addition, the image of FIG. 6A looks like a random arrangement of objects unless one knows the shared secret.

Figure 6B:
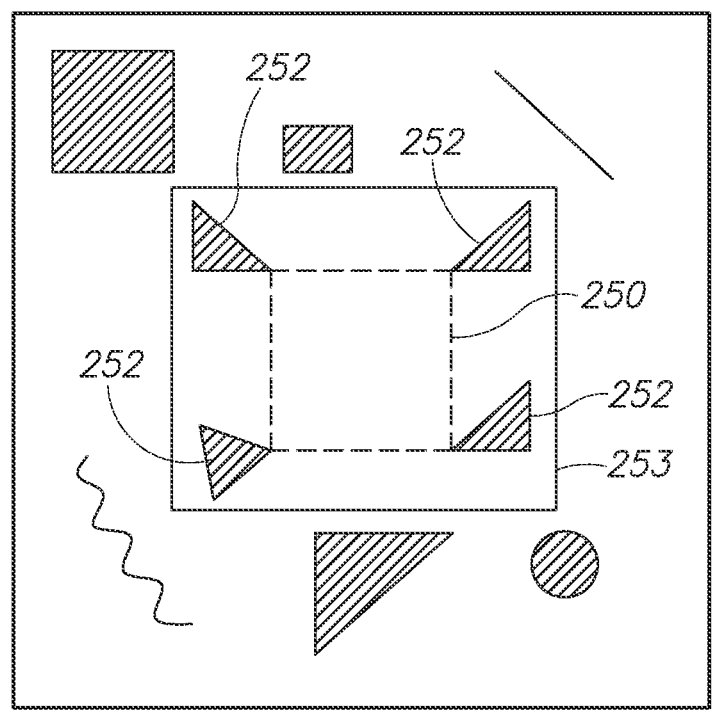
FIG. 6B is an example of the image of FIG. 6A modified by a user in accordance with a shared modification secret.

As noted above, the user does not need to be aware of the shared secret shared between the server 110 and the mobile communication device 130. The mobile communication device 130 can capture the image on the display 104 and perform the analysis described above. The user may be aware of the secret shared between the server 110 and the mobile communication device 130. However, the user must be aware of the shared modification secret that dictates the modifications to the captured image that will be made by the user. As illustrated in FIG. 6B, the shared modification secret is that the user will draw a rectangle 253 around four triangles (e.g., the triangles 252) in the captured image. The rectangle 253 can simply be a line around the triangles 252, and the area within the rectangle 253 may be transparent or opaque. The mobile communication device 130 transmits the modified image of FIG. 6B to the server 110 via the PLMN 120 as described above. The server 110 is aware of the shared secret used to generate the image of FIG. 6A and is also aware of the shared modification secret shared that guides the modification of the image, as shown in FIG. 6B. The server 110 will analyze the received image of FIG. 6B to determine whether the image contains the shared modification secret. If the image is modified in accordance with the shared modification secret, the user is thereby authenticated. Other types of shared secrets, such as a circle around the triangles 252, or a circle around a square, or other similar simple modification may also be used as the shared modification secret.

Figure 7A:
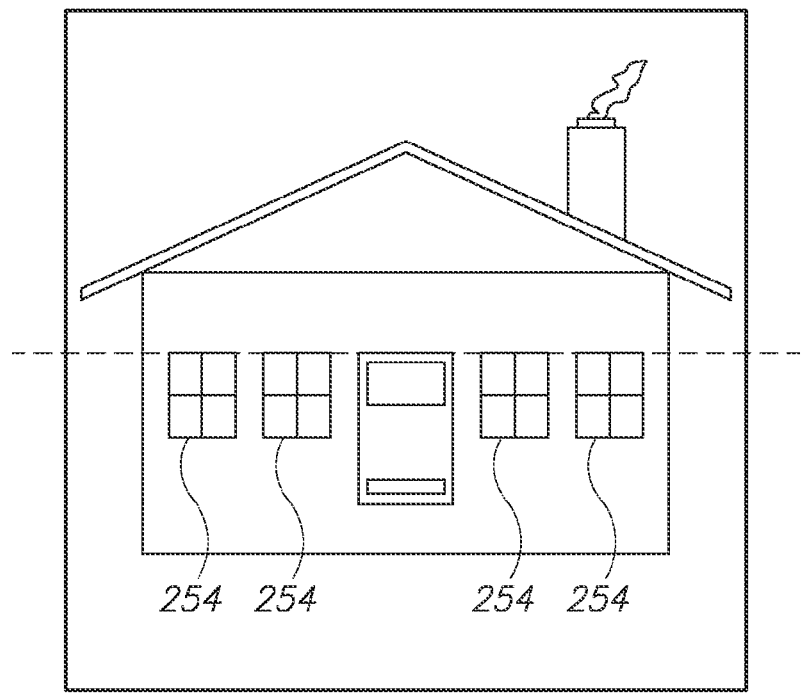
FIG. 7A illustrates an alternative embodiment of an image with a geometric relationship between elements.

FIG. 7A can be a picture of a real house or a graphically generated house. Again, without knowledge of the shared secret, the image in FIG. 7A appears to be a normal house. However, the shared secret is that the tops of the windows 254 are all aligned. Thus, it is not merely the presence of the house in the image of FIG. 7A that authenticates the server 110, but that the geometric relationship of the windows 254 is such that the tops of the windows are in alignment. Without knowledge of this shared secret, the server 110 cannot generate the appropriate image and the mobile communication device 130 cannot analyze the image in accordance with the shared secret. Conventional authentication systems may simply send the picture of a house that is known to the user. In contrast, the object in FIG. 7A is not merely identified by the user as a known object, but must contain the shared secret element (e.g., the tops of the windows 254 in alignment). Furthermore, the image of the house may change from one authentication process to the next such that the image in FIG. 7A is not a static image that is always presented to the user upon log-in. In an exemplary embodiment, the user of the mobile communication device 130 need not even know the shared secret used to generate the image of FIG. 7A.

Figure 7B:
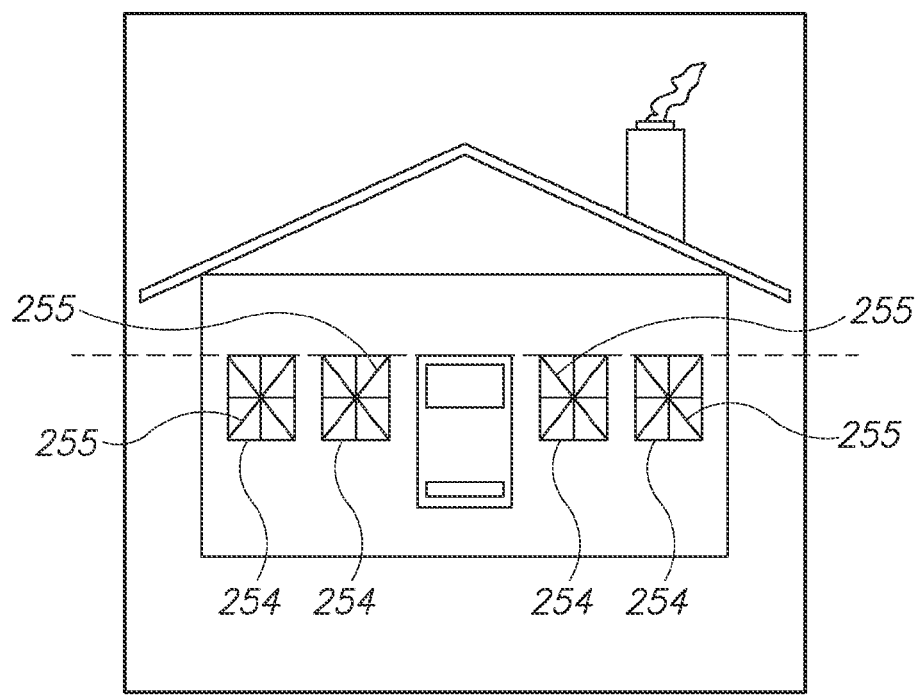
FIG. 7B is an example of the image of FIG. 7A modified by a user in accordance with a shared modification secret.

However, the user must be aware of the shared modification secret used to modify the image of FIG. 7A. For example, the shared modification secret could be that the user must place an "X" in each of the windows 254 to generate the image illustrated in FIG. 7B. As noted above, the user need not know that the shared secret shared between the server 110 and the mobile communication device 130 is that the windows 254 are in alignment at the top. The user simply knows that he must place an "X" in each of the windows. Thus, the image of FIG. 7B is transmitted by the mobile communication device 130 to the server 110 via the PLMN 120 in the manner described above. The server 110 analyzes the modified image to determine if it has been modified in accordance with the shared modification secret. If the image has been appropriately modified, the user may thus be authenticated by the server 110.

Figure 8A:
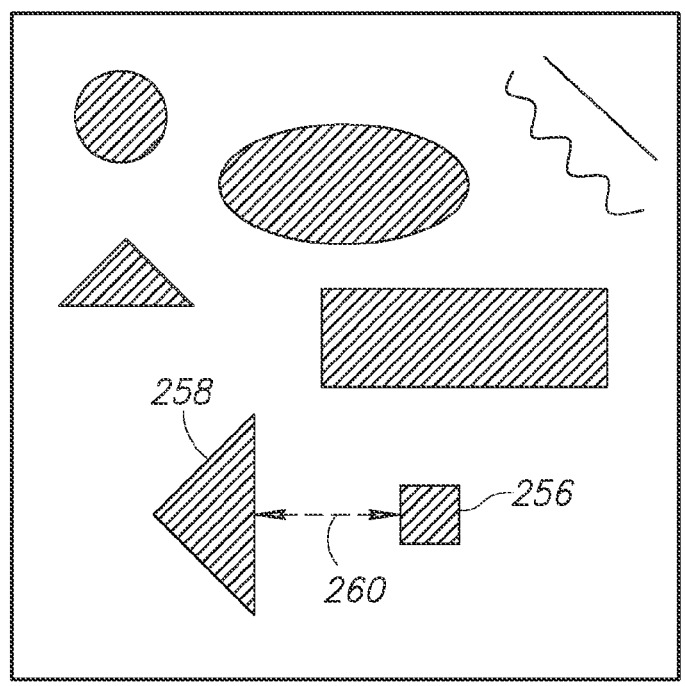
FIG. 8A is an image illustrating a secret mathematical relationship between elements.
Figure 8B:
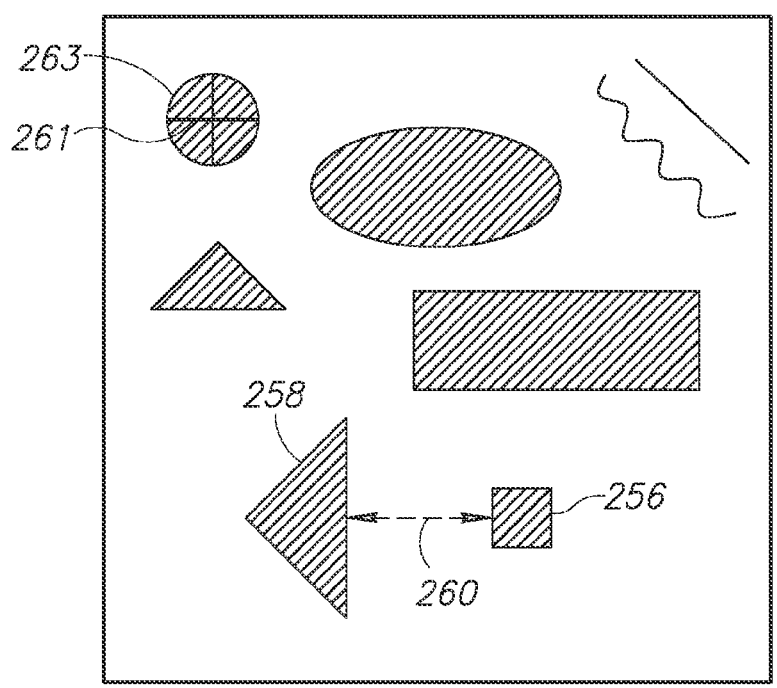
FIG. 8B is an example of the image of FIG. 8A modified by a user in accordance with a shared modification secret.

In another example embodiment, there is a mathematical relationship between objects in an image. For example, FIG. 8A is similar to FIG. 6A in that it illustrates a number of geometric shapes in what appears to be a random arrangement including a square 256 and a triangle 258. However, in the example of FIG. 8A, the shared secret is that the square 256 and triangle 258 are separated by a distance 260 that is 2.5 times the height of the square 256. The absolute location of the square 256 and triangle 258 within the image is not critical. Similarly, the distance 260 between the square 256 and the triangle 258 can vary from one image to another. What is critical is that the distance separating these two objects has a precise mathematical relationship with the height of the square 256. Thus, the image in FIG. 8A can look different each time it is generated at a log-in request so long as the shared secret mathematical relationship between objects is maintained.

In the examples of FIGS. 6B and 7B, the modification involved these elements that were part of the shared secret shared between the server 110 and the mobile communication device 130. For example, in FIG. 6B, the user must draw the rectangle 253 around the triangles 252 that were used to form the square 250. However, the shared modification secret need not be related to the elements that were part of the shared secret shared between the server 110 and the mobile communication device 130. For example, in FIG. 8B, the shared modification secret is that the user must place a "+" sign 261 in a circle (e.g., the circle 263 in FIG. 8B). Although FIGS. 8A-8B contain only one circle, it is possible that the image might contain multiple circles and the user can put a "+" sign in any of the circles, in all circles, in the smallest circle, in the largest circle, or the like. Those skilled in the art will appreciate that a number of variations (e.g., draw a triangle or a square around the circle 263) may be utilized as the shared modification secret. As discussed with other modified images, the mobile communication device 130 transmits the modified image of FIG. 8B to the server 110 via the PLMN 120, as described above. The server 110 analyzes the modified image of FIG. 8B to determine if it has been modified in accordance with the shared modification secret. The user is authenticated if, and only if, the image has been modified in accordance with the shared modification secret.

Figure 9A:
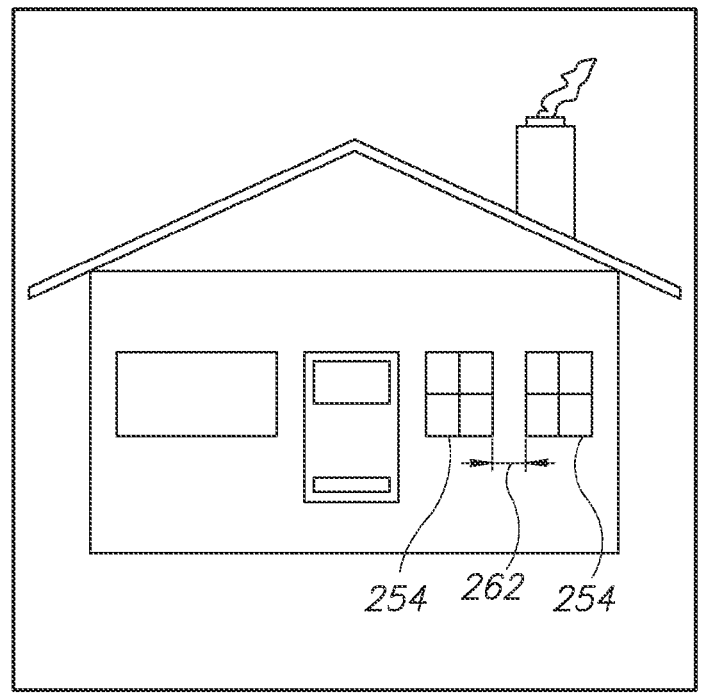
FIG. 9A is an alternative embodiment of an image illustrating a mathematical relationship between the elements.

FIG. 9A illustrates another example of the mathematical relationship between objects within the image. FIG. 9A is similar to FIG. 7A in that it can be a picture of a real house or a computer-generated image of a house. In the example of FIG. 7A, the shared secret was that the tops of the windows 254 are in alignment. In FIG. 9A, the shared secret is that the windows 254 are separated by a distance 262 that is one-half the width of the right-most window. Thus, the shared secret may contain a mathematical relationship between objects in the image that are only known if the mobile communication device 130 and server 110 both know the shared secret.

Figure 9B:
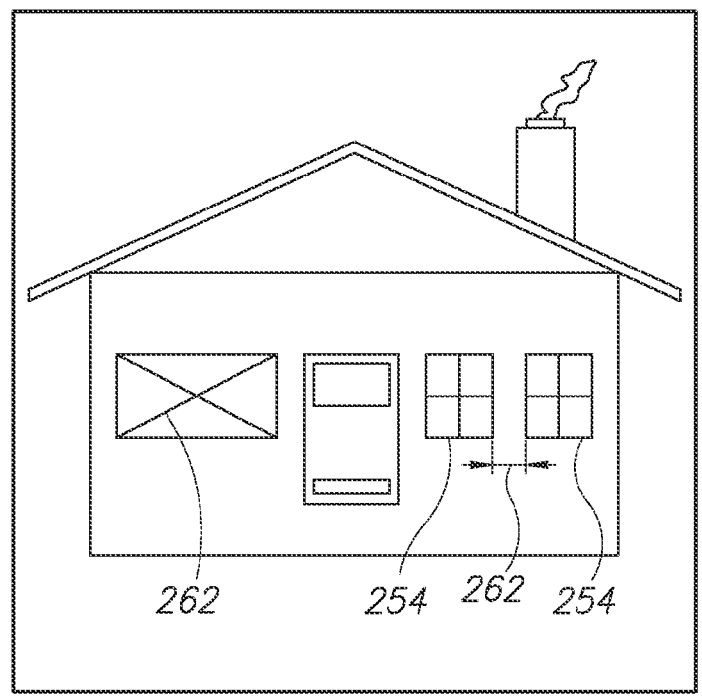
FIG. 9B is an example of the image of FIG. 9A modified by a user in accordance with a shared modification secret.

In the example of FIG. 9A, the shared modification secret may be that the user must draw an "X" 262 in the largest window to thereby generate the modified image of FIG. 9B. Alternatively, the shared secret may be that the user places an "X" in the left most window, which would result in the same modified image of FIG. 9B. Those skilled in the art will appreciate that a number of other shared modification secrets may also be utilized. For example, in one embodiment, the user must draw a circle around smoke anywhere in the image. In the image of FIG. 9A, the smoke emanates from the chimney of the house. Thus, the user would draw a circle around the smoke coming from the chimney. In a different embodiment, the image could be that of a camp scene with smoke emanating from a campfire. Without any knowledge of the shared secret shared between the server 110 and the mobile communication device 130, the user would simply know that they must circle smoke in the image. Other simple modifications, such as an "X" on the door, a circle around the two windows on the right, or other modifications may also be readily employed by the system 100. As with other images, the captured image of FIG. 9B is transmitted by the mobile communication device 130 to the server 110 via the PLMN 120. The server 110 analyzes the modified image to determine if it has been modified in accordance with the shared modification secret. If the image has been modified in accordance with the shared modification secret, the user may be authenticated.

In yet another example, the shared secret may be that the picture contains a predetermined number of objects or certain types of objects within the picture. For example, the image of the house in FIGS. 7A and 9A contain different shared secrets in images that are quite similar. In yet another example of a shared secret, the image of FIG. 7A must contain exactly four windows 254 and one door. Thus, the same image (e.g., FIG. 7A) may be used with different shared secrets.

Similarly, the same image (e.g., FIG. 7B) may be used with a number of different shared modification secrets. For example, the user can place the "X" 255 in each of the windows 254, as illustrated in FIG. 7B. Alternatively, the shared modification secret may be to place the "X" 255 only in the windows 254 to the right of the door, to the left of the door, to the closest windows on each side of the door, or the like. Furthermore, as discussed above, the shared modification secret may be unrelated to the elements of the shared secret shared between the server 110 and the mobile communication device 130. For example, the shared modification secret may be to circle smoke in the image, to place a triangle around the smoke in the image, or the like. Those skilled in the art will appreciate that a number of different variations of the shared modification secret may be used for any given image.

Figure 10A:
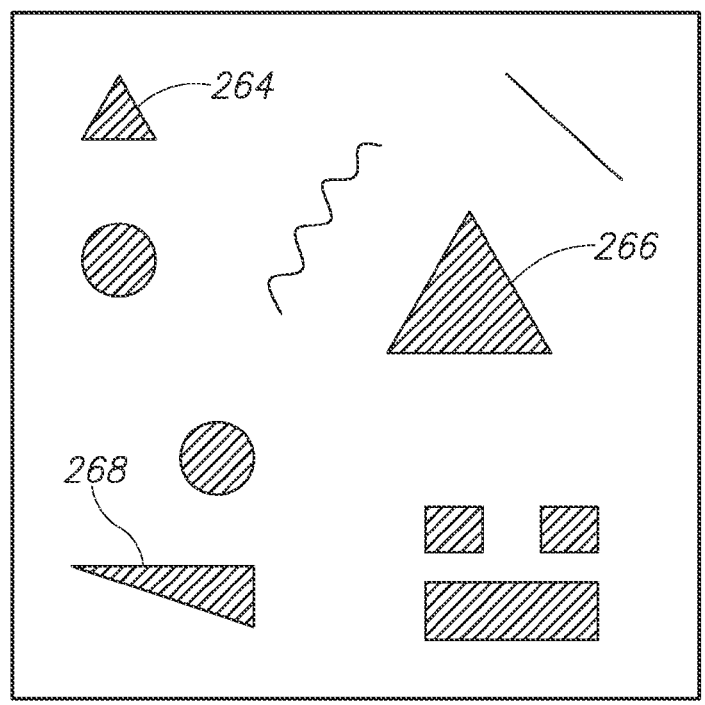
FIG. 10A is an image illustrating a particular number or type of elements in the secret relationship in the image.

In another example, the image in FIG. 10A appears similar to the images in FIGS. 6A and 8A and contains a number of different geometric shapes (e.g., circles, triangles, etc.). The shared secret in FIG. 10A is that the image must contain exactly three triangles 264-268. In yet another variation, the shared secret may be that FIG. 10 must contain the three triangles 264-268, but that two of the triangles must be equilateral triangles (e.g., the triangles 264-266), while the third triangle must be a right triangle (e.g., the triangle 268). Thus, the shared secret may be the number of objects (e.g., the number of triangles) and/or type of objects (two equilateral triangles and one right triangle).

Figure 10B:
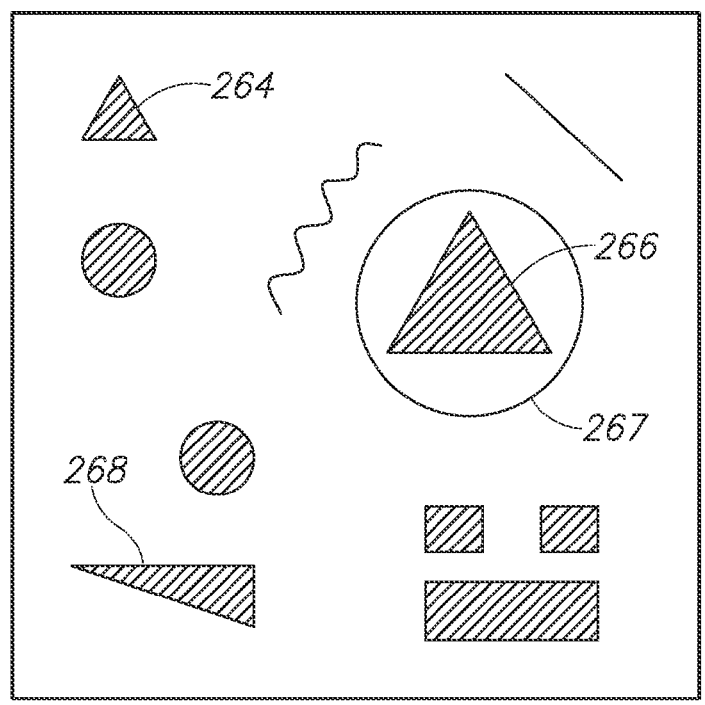
FIG. 10B is an example of the image of FIG. 10A modified by a user in accordance with a shared modification secret.

The shared modification secret can include a variety of possible modifications. One possible modification is to draw a circle 267 around the largest triangle (e.g., the triangle 266) as shown in FIG. 10B. Alternatively, the shared modification secret may be to draw a circle around one equilateral triangle (e.g., either the triangle 264 or the triangle 266). Other shapes, such as a square around the triangle 266 or a circle around a circle, a square around a circle, or the like may be used as the shared secret image shown in FIG. 10B. As discussed above, the mobile communication device 130 transmits the modified image of FIG. 10B to the server 110 via the PLMN 120. The server 110 determines whether the image has been modified in accordance with the shared modification secret. If the image has been modified in accordance with the shared modification secret, the user is thereby authenticated.

Figure 11A:
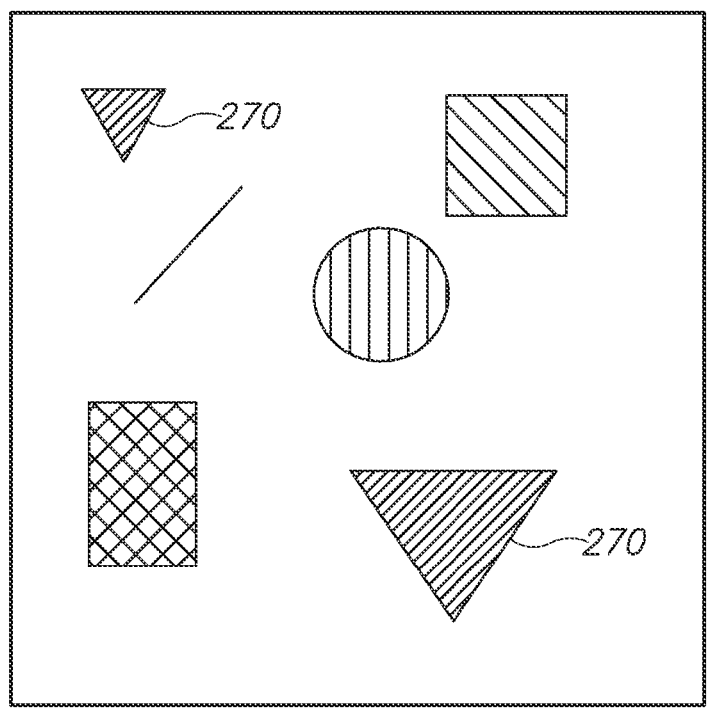
FIG. 11A is an alternative embodiment to FIG. 6 illustrating a particular number or type of elements in the image.

FIG. 11A illustrates yet another example of geometric shapes constructed in accordance with a shared secret. In the example of FIG. 11A, the different geometric shapes must each have a different color with the exception of two triangles 270, which must be blue. In this example, it is not the specific shape of the triangles (e.g., equilateral or right triangles), but the number of triangles (e.g., two triangles) and the color of the triangles (e.g., blue).

Figure 11B:
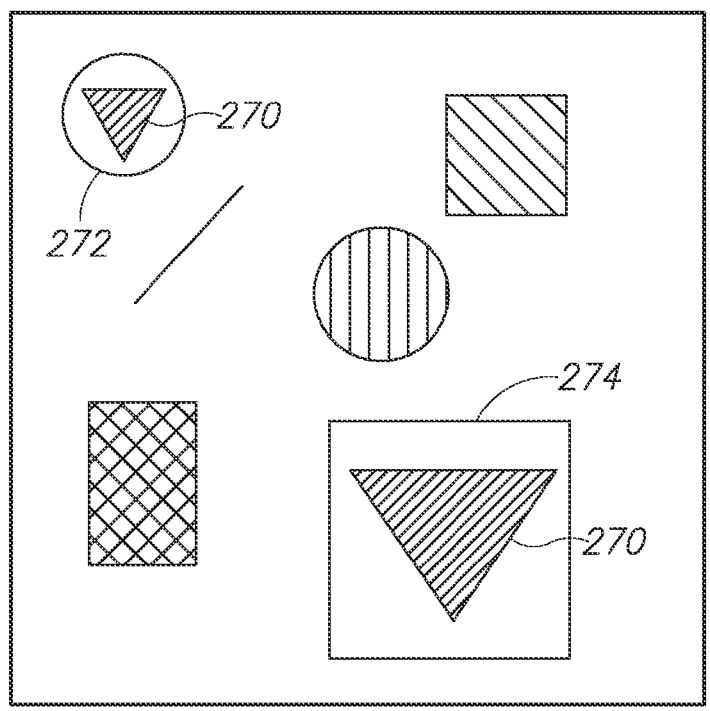
FIG. 11B is an example of the image of FIG. 11A modified by a user in accordance with a shared modification secret.

In turn, there may be a number of shared modification secrets. For example, the shared modification secret may be that the user must draw a circle around each triangle, or a circle 272 around the smallest triangle (e.g., the small triangle 270) and a square 274 around the largest triangle (e.g., the large triangle 270), as illustrated in FIG. 11B. Alternatively, the shared modification secret may require the user to place an "X" through the red object in the image. Alternatively, the user must draw a line between the two green images or the two squares, or the like in the image. Thus, those skilled in the art will appreciate that a number of different shared modification secrets may be used with the same image.

Figure 12A:
FIG. 12A is an image illustrating a type of element in the secret relationship in the image.
Figure 12B:
FIG. 12B is an example of the image of FIG. 12A modified by a user in accordance with a shared modification secret.

In yet another example, the shared secret shared between the server 110 and the mobile communication device 130 may be that the image always contains someone named "George," such as illustrated in FIG. 12A where the picture of Mount Rushmore contains an image of George Washington. In turn, the shared modification secret may be that the user must draw a mustache on anyone named "George" in the image, to generate the modified image of FIG. 12B. In examples where an image contains multiple persons named "George," the user can modify the image to place a mustache on each person named "George" in the image. Other variations, such as placing a mustache on the image of the person named "George" on the left side of the image may also be used.

FIGS. 6A-12A illustrate individual examples of shared secrets contained within images. However, those skilled in the art will appreciate that the shared secret may be combinations of objects described above or multiple shared secrets. For example, the image of FIG. 7A may be a combination of shared secrets such as the precise number of windows 254 and doors, the alignment of windows, and the color of the house. Furthermore, the spacing between the windows 254 in FIG. 7A may be yet another shared secret.

Those skilled in the art can appreciate that the analysis of the images to determine whether the shared secret is present is relatively straight forward so long as the mobile communication device 130 and server 110 know the shared secret. The mobile communication device 130 can quickly analyze any of the images illustrated in the examples of FIGS. 6A-12A to determine whether the image contains the shared secret. Since only the authentic mobile communication device 130 and the authentic server 110 know the shared secret, only those two devices can perform the process described above. If the server 110 is not the authentic server, it cannot generate an image in accordance with the shared secret. The mobile communication device 130 can quickly discern that the image does not contain the shared secret such that the server would not be authenticated in step 234 of FIG. 5. Thus, the mobile communication device 130 can readily authenticate the server 110 on the basis of the shared secret.

Similarly, the server 110 can readily determine whether the image has been modified in accordance with the shared modification secret. Thus, the system described herein can be used to authenticate both the server 110 by analysis of the shared secret shared between the server 110 and the mobile communication device 130 and also authenticate the user by virtue of the shared modification secret.

Those skilled in the art will appreciate that the process described above is particularly valuable when the computer 102 is a public computer whose authenticity cannot be readily verified. However, if the client computer 102 is a private computer that can be authenticated to the server 110, the image analysis described above can be performed by the computer 102 itself rather than the mobile communication device 130. In this alternative embodiment, it is not necessary to capture the image on the display 104 using the imaging device 176 in the mobile communication device 130. Rather, the image analyzer 178 illustrated in FIG. 3 can be implemented within the computer 102 to perform the same form of image analysis to thereby determine whether the image is constructed in accordance with the shared secret. In this embodiment, the shared secret is stored directly in the computer 102. Furthermore, in this embodiment, the user can modify the image directly on the computer 102. The various modifications illustrated in FIGS. 6B-12B can be easily performed on the computer 102 using readily available software programs. In this embodiment, the modified image can be sent directly from the computer 102 to the server 110 via the network 106. Alternatively, the modified image on the display 104 can be captured by the mobile communication device 130 and transmitted back to the server 110 via the PLMN 120 as described above.

The shared secrets may be changed by both the mobile communication device 130 and the server 110 periodically or based on a network update mechanism or physical update mechanism to the mobile communication device 130 or the server 110.

In yet another embodiment, the server 110 (see FIG. 1) and the unauthenticated computer 102 and/or mobile communication device 130 share stored image data. In this embodiment, the server 110 transmits one image to the unauthenticated computer 102 in the manner described above. That is, the server 110 transmits a first image data to the unauthenticated computer 102 for display on the computer display 104. In one embodiment, the image is known to the user and thus serves as a means of authenticating the server 110 itself. Alternatively, the image displayed on the display 104 may be unknown to the user. In either event, the image received from the server 110 is combined with a previously stored image.

In one embodiment, the previously stored image is stored within the unauthenticated computer 102. In this embodiment, the image transmitted from the server 110 is combined with the image previously stored on the unauthenticated computer 102 to generate a combined image. The combination process will be described in greater detail below. The combined image may be returned to the server 110 directly by the unauthenticated computer 102 via the communication link 108. Alternatively, the combined image may be shown on the display 104 and the combined image captured by the imaging device 176 (see FIG. 3) on the mobile communication device 130. In this embodiment, the combined image is captured by the mobile communication device 130 and returned to the server 110 via the PLMN 120. The PLMN 120 may be coupled to the server 110 via the network 106, or may have a direct link (not shown) to the server 110.

In yet another alternative embodiment, the stored image is not stored within the unauthenticated computer 102, but is stored within the mobile communication device 130. In this embodiment, the server 110 transmits the first image to the unauthenticated computer 102 in the manner described above. The unauthenticated computer 102 displays the first image on the display 104 in its original form. In this embodiment, the imaging device 176 (see FIG. 3) of the mobile communication device 130 captures the original image and combines the captured image with the image previously stored in the mobile communication device 130. Thus, the combined image is generated within the mobile communication device 130 rather than the unauthenticated computer 102. The combined image is returned to the server 110 via the PLMN 120, as described above.

The combined image is generated by combining the original image transmitted from the server 110 with the previously stored image using a logical operator, such as AND, OR, NAND, NOR, and XOR, and the like. That is, the image transmitted from the server 110 is combined with the stored image using a selected one of the logical operators. The combination image is generated by combining image data bits using the selected logical operator. In one embodiment, the unauthenticated computer 102 or mobile communication device 130 that will combine the image transmitted from the server 110 with the stored image can use a pre-selected logical operator. In this embodiment, the combined image will always be generated using the pre-selected logical operator. For a greater level of security, the device generating the combined image (i.e., either the unauthenticated computer 102 or mobile communication device 130) can randomly select one of the available logical operators for use in generating the combined image. In this manner, an unscrupulous individual has greater difficulty in attempting to generate a combined image because the combined image may look different from one authentication process to the next even though the image transmitted from the server 110 and the stored image are identical from one authentication to the next.

Because the image combining process merely uses a logical operator to combine data bits from the first and second images, the processing requirement by the unauthenticated computer 102 or mobile communication device 130 is relatively low.

As noted above, the combined image is sent to the server 110. The server 110 stores both the original image transmitted to the unauthenticated computer 102 as well as the image stored within the unauthenticated computer or mobile communication device 130. The server 110 can combine the originally transmitted image and the stored image to generate a template combined image using the logical operator. In one embodiment, the server 110 also knows which logical operator is used to combine the images. The template combined image is compared with the combined image received from the unauthenticated computer 102 or mobile communication device 130. If the received combined image matches the template combined image, the device sending the combined image (i.e., the unauthenticated computer 102 or mobile communication device 130) is thereby authenticated. If the device sending the combined image is the mobile communication device 130, the user of the mobile communication device 130 is thereby authenticated. By inference, the unauthenticated computer 102 may thereby be authenticated for use by the user of the mobile communication device 130. This will allow authentication of a computer, even when the computer 102 may be a public computer (e.g. in a library or hotel lobby). Thus, the process described herein permits authentication of the user and computer operated by the user.

In another embodiment, the server 110 does not know the particular logical operator used to combine the images. However, the server 110 does have knowledge of the set of logical operators that may have been used to generate the combined image. That is, the server 110 knows that one of the set of logical operators was used to combine the image transmitted to the unauthenticated computer 102 and combined with the previously stored image. In this embodiment, the server 110 can sequentially generate template combined images using the available set of logical operators to see if any of the template combined images match the combined image received from the unauthenticated computer 102 or mobile communication device 130. For example, the server 110 can combine the original transmitted image and the stored image to generate a first template combined image using a first logical operator, such as an AND operator. The template combined image made with the AND operator is compared with the combined image received from the unauthenticated computer 102 or mobile communication device 130. If the received combined image matches the template combined image, the device sending the combined image is thereby authenticated. If the template combined image generated with the AND operator does not match the received combined image, the server 110 can combine the original transmitted image and the stored image using a different logical operator, such as an OR operator to thereby generate a second template combined image. The second template combined image may be compared with the received combined image to determine if there is a match. Because there are a limited number of logical operators used to generate the combined image, the server 110 can readily generate a series of template combined images using the set of available of logical operators. Each of the template combined images may be sequentially generated and compared with the received combined image to determine if there is a match. If any of the template combined images matches the received combined image, the device sending the combined image is thereby authenticated.

Those skilled in the art will appreciate that the server 110 can dynamically generate the template combined images after the combined image is received from the unauthenticated computer 102 or mobile communication device 130 during the authentication process. Alternatively, the server 110 can generate one or more template combined images in advance and store the various possible combined images for retrieval upon receipt of the combined image from the unauthenticated computer 102 or mobile communication device 130.

Figure 13:
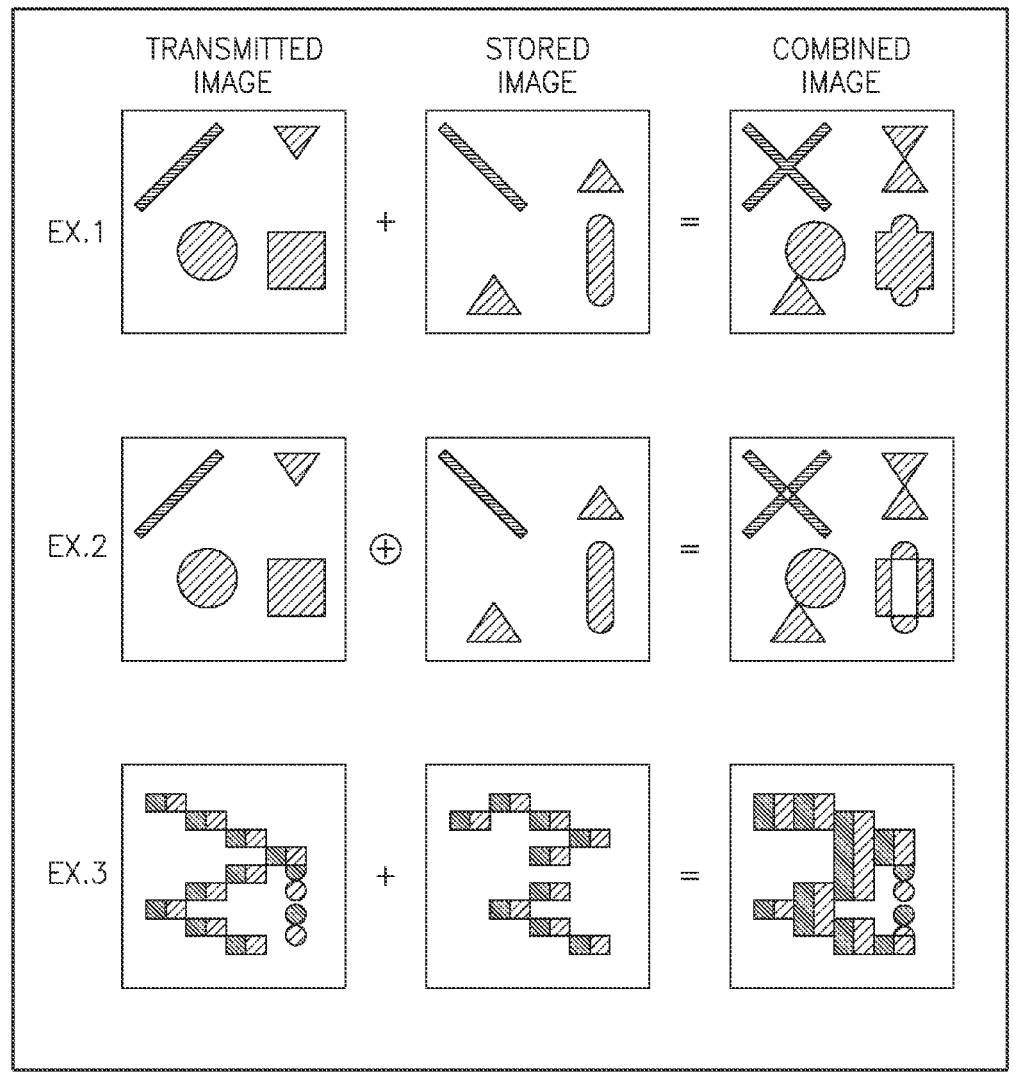
FIG. 13 is an example of images that may be automatically combined to generate a combined image and authentication process.

FIG. 13 illustrates some example images. Examples 1 and 2 of FIG. 13 illustrate an example using the same transmitted image (i.e., the image transmitted from the server 110 to the unauthenticated computer 102) and the same stored image (i.e., the image stored in the unauthenticated computer 102 or mobile communication device 130). However, example 1 illustrates a combined image generated using an OR logical operator while example 2 shows a combined image generated using an XOR logical operator. Thus, the same transmitted and stored images can be combined using different logical operators to produce different combined images.

Example 3 illustrates a different transmitted and stored image that is combined using an OR logical operator. The images in examples 1 and 2 may be black and white images, while the image in example 3 uses half-tone images. Those skilled in the art will appreciate that color images may also be used for the transmitted image and the stored image. With color images, the overall shapes may be combined using the selected logical operator and the colors will also be combined using the selected logical operator. Two color images, or one color image and one black/white image, may be combined using a bit-wise logical operator in the same manner discussed above. That is, the pixels associated with each image are combined using the selected logical operator. In the case of color images, the color data in the pixels is also combined using the selected logical operator.

Figure 14:
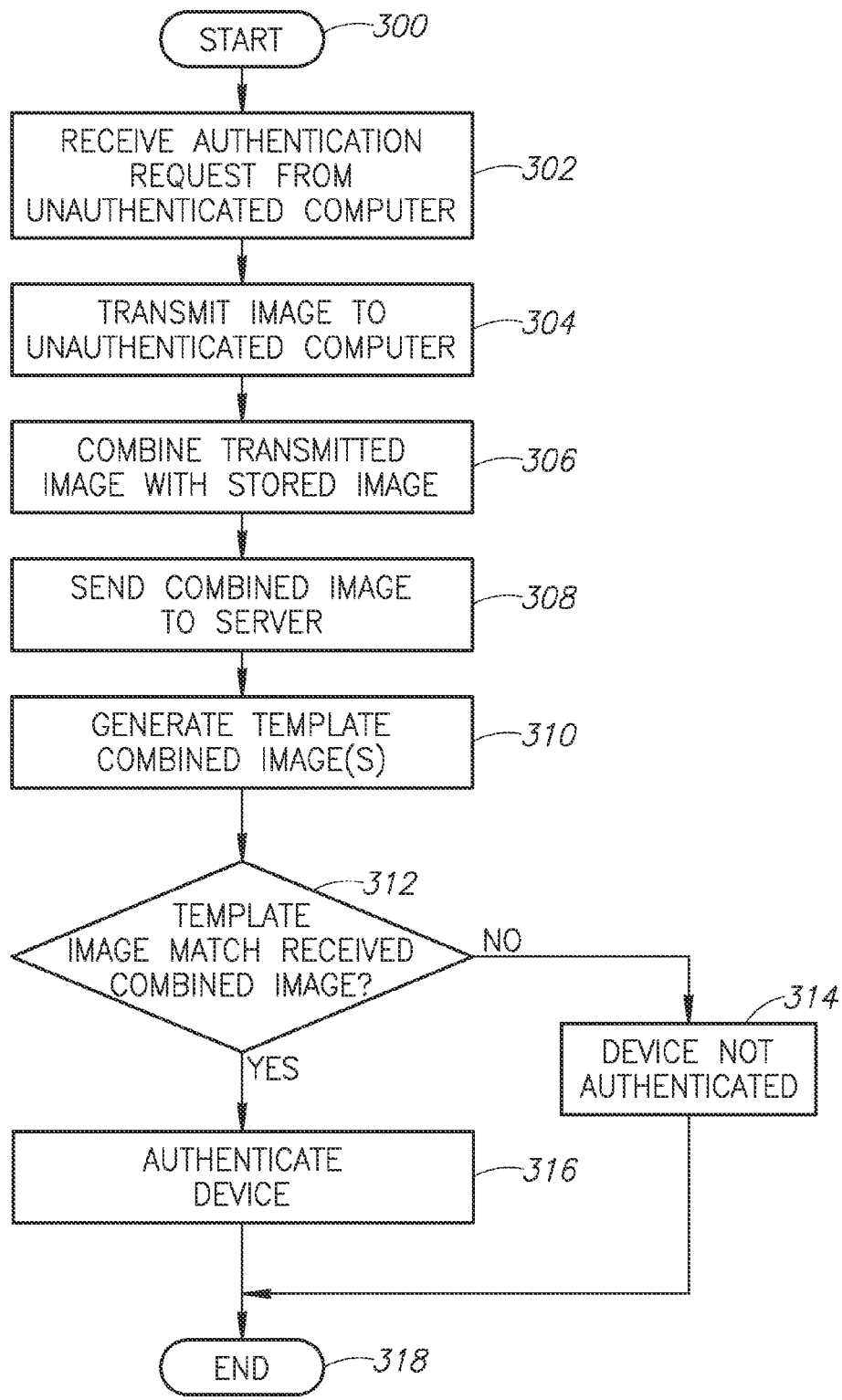
FIG. 14 is a flow chart illustrating the operation of the system with the images of FIG. 13.

FIG. 14 is a flow chart illustrating an exemplary implementation of the system described above. At a start 300 the server 110 (see FIG. 1) has copies of the image to be transmitted to the unauthenticated computer 102, as well as the image stored on the unauthenticated computer 102 or the mobile communication device 130. In step 302, the server receives an authentication request from the unauthenticated computer 102. For example, the user can operate a web browser on the unauthenticated computer 102 to navigate to a website log-in page. In step 304, the server 110 transmits the first image to the unauthenticated computer 102.

In step 306, the image transmitted from the server 110 is combined with the stored image using a selected one of the logical operators to thereby generate the combined image. As noted above, the stored image can be stored on the unauthenticated computer 102. In this embodiment, the stored image may be combined with the image transmitted from the server 110 to the unauthenticated computer 102. Alternatively, the stored image may be stored on the mobile communication device 130. In this embodiment, the unauthenticated computer 102 displays the image transmitted from the server 110 on the computer display 104. That displayed image is captured by the imaging device 176 (see FIG. 3) on the mobile communication device 130 and the captured image is combined with the stored image using a selected logical operator to thereby generate the combined image on the mobile communication device 130.

In step 308, the combined image is sent back to the server. As noted above, there are a variety of optional pathways for the return of the combined image. If the combined image is generated by the unauthenticated computer 102 in step 306, it may transmit the combined image directly back to the server 110 using the communication link 108. Alternatively, the combined image may be generated by the unauthenticated computer 102 in step 306 and shown on the computer display 104. The imaging device 176 on the mobile communication device 130 captures the combined image on the display 104 and transmits it back to the server 110 via the PLMN 120.

In yet another alternative embodiment, the combined image is generated in the mobile communication device 130. In this embodiment, the image transmitted from the server 110 to the unauthenticated computer 102 is shown on the display 104 and captured by the imaging device 176 of the mobile communication device 130. The mobile communication device 130 generates the combined image (in step 306) and, in step 308, the mobile communication device 130 transmits the combined image to the server 110 via the PLMN 120.

In step 310, the server generates one or more template combined images. As noted above, the template combined images may be generated in advance and stored within the server or generated dynamically during the authentication process (e.g., when the first image is transmitted to the unauthenticated computer 102 or when the combined image is received by the server 110).

In decision 312, the server determines whether the template combined image matches the received combined image.

If the template combined image does not match the received combined image, the result of decision 2312 is NO and, in step 314, the device is not authenticated. As described above, in some embodiments, the server 110 does not know which of the set of logical operators were used to generate the combined image. In this embodiment, the process illustrated in decision 312 may be repeated for each of the possible logical operators to determine if any of those multiple template combined images match the received combined image.

If any of the template combined images match the received combined images, the result of decision 312 is YES. In that event, the server 110 can authenticate the device sending the combined image. After the device is authenticated in step 316 or not authenticated in step 314, the process ends at 318.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
    a server computer communicatively coupled to a client computer via a network;
    a data storage structure associated with the server computer and configured to store first and second images;
    a network interface device associated with the server computer and configured to transmit the first image to the client computer via the network, the network interface device being further configured to receive an image from the client computer or a mobile device; and
    an image analyzer associated with the server computer and configured to analyze the image received by the network interface device by combining the stored first and second images to thereby generate a combined image and to determine if the combined image matches the received image wherein the client computer is authenticated if the image analyzer determines that the received image matches the combined image.

2. The system of claim 1 wherein the image analyzer is configured to combine the stored first and second images by applying a logical operator to the stored first and second images.

3. The system of claim 2 wherein the logical operator is selected from a set of logical operators comprising an OR operator, an AND operator, a NOR operator, a NAND operator, an XOR operator, and a NOT operator.

4. The system of claim 2 wherein the image analyzer is configured to combine the stored first and second images by applying a predetermined logical operator to the stored first and second images.

5. The system of claim 2 wherein the image analyzer is configured to combine the stored first and second images by separately applying each of a plurality of logical operators to the stored first and second images to thereby generate a plurality of combined images and to determine if the received image matches any of the plurality of combined images.

6. The system of claim 5 wherein the image analyzer is configured to apply a first of the plurality of logical operators to the stored first and second images to thereby generate a first combined image and to determine if the received image matches the first combined image, and if the images analyzer determines that the received image does not match the first combined image, the image analyzer being further configured to apply a second of the plurality of logical operators to the stored first and second images to thereby generate a second combined image and to determine if the received image matches the second combined image.

7. The system of claim 1, wherein the combined image is a first combined image, and the client computer comprises:
    a storage area configured to store a copy of the second image;
    a processor configured to combine the first image received from the server computer with the copy of the second image to generate a second combined image; and
    a display configured to display the second combined image and wherein the image received by the network interface device is a copy of the second combined image captured by the mobile device and delivered to the network interface device by the mobile device.

8. The system of claim 1, wherein the client computer comprises a display configured to display the first image received from the server computer, and wherein the image received by the network interface device is the displayed first image captured and combined with a copy of the second image stored in the mobile device, and wherein the combined image generated by the mobile device is delivered to the server computer by the mobile device.

9. The system of claim 1 wherein at least one of the first and second images are black and white images.

10. The system of claim 1 wherein at least one of the first and second images are color images.

11. A method for authentication of a client computer, the method comprising:
    storing first and second images;
    transmitting the first image to the client computer;
    receiving an image from the client computer or a wireless communication device as a received image;
    combining the first and second stored images to thereby generate a template combined image;
    comparing the template combined image with the received image to determine if there is a match; and
    authenticating the client computer if there is a match.

12. The method of claim 11 wherein combining the first and second stored images comprises applying a logical operator to the stored first and second images.

13. The method of claim 11 wherein combining the first and second stored images comprises applying a known logical operator to the stored first and second images.

14. The method of claim 11 wherein combining the first and second stored images comprises:
    applying a logical operator selected from a group of logical operators to the stored first and second images to thereby generate the template combined image;
    comparing the template combined image with the received image to determine if there is a match; and
    if the template combined image does not match the received image, repeating the steps of applying a logical operator and comparing the template combined image until a match is found or until all logical operators from the group of logical operators have been used to generate template combined images.

15. The method of claim 11 wherein receiving the image from the client computer or the wireless communication device comprises receiving a combined image from the client computer via a computer network.

16. The method of claim 11 wherein receiving the image from the client computer or the wireless communication device comprises receiving a combined image from the wireless communication device via a public land mobile network.

17. A method for authentication of a client computer, the method comprising:
    storing a first image;
    receiving a second image from a server computer via a computer network;
    combining the first and second images using a selected logical operator to thereby generate a combined image; and
    transmitting the combined image back to the server computer to permit authentication by the server, wherein the server computer receives the combined image as a received combined image, combines the second image with a copy of the first image to thereby generate a server combined image, determines whether the server combined image matches the received combined image; and authenticates the client computer when the server computer determines the server combined image matches the received combined image.

18. The method of claim 17 wherein receiving the second image from the server computer and combining the first and second images is performed by the client computer.

19. The method of claim 18 wherein transmitting the combined image back to the server computer is performed by the client computer transmitting the combined image to the server computer via the computer network.

20. The method of claim 18, further comprising:
    displaying the combined image on a display associated with the client computer; and
    capturing an image of the displayed combined image using an imaging device associated with a wireless communication device, wherein transmitting the combined image back to the server computer is performed by the wireless communication device using a public land mobile network.

21. The method of claim 17, further comprising:
    displaying the second image on a display associated with the client computer; and
    capturing an image of the second image using an imaging device associated with a wireless communication device, wherein combining the first and second images is performed by the wireless communication device.

22. The method of claim 21 wherein transmitting the combined image back to the server computer is performed by the wireless communication device using a public land mobile network.

* * * * *